United States Patent Office 2,995,595
Patented Aug. 8, 1961

2,995,595
O,O - DIMETHYL - S - (ISOPROPYLCARBAMINYL-METHYL-)DITHIO-PHOSPHORIC ACID ESTER

Walter Lorenz, Wuppertal-Elberfeld, and Gerhard Schrader, Opladen, Germany, assignors to Farbenfabriken Bayer Aktiengesellschaft, Leverkusen, Germany, a corporation of Germany
No Drawing. Filed July 18, 1956, Ser. No. 598,505
Claims priority, application Germany July 29, 1955
1 Claim. (Cl. 260—461)

This invention relates to new and useful thiophosphoric acid esters, particularly to O,O-dimethyl-S-(isopropylcarbaminylmethyl-)dithiophosphate of the formula

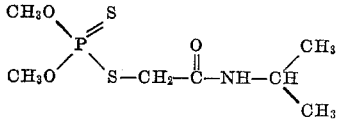

The preparation of carbaminylalkyl esters of dithiophosphoric acid is well known from German patent specification No. 819,998. Of this series the O,O-diethyl-S-(isopropylcarbaminylmethyl-)dithiophosphoric acid ester is regarded as a particularly active representative and this compound became important in the combating of insects.

It has now been found that surprisingly O,O-dimethyl-S - (isopropylcarbaminylmethyl - )dithiophosphoric acid ester excels in an outstanding insecticidal activity as against the ethyl compound. Whilst for example the ethyl compound is not systemically active, the dimethyl ester distinguishes itself by an outstanding systemic action. Other advantages of the dimethyl ester are its considerably lower toxicity whilst having the same, sometimes even increased insecticidal action.

The new ester may be applied as a plant protecting agent preferably with carriers or diluents. If used in aqueous dilutions addition of emulsifiers is advisable to ensure homogeneous distribution and better contact with the plants. The concentration of the solution or dilutions to be applied varies as to the insects to be killed or to the plants to be protected.

The O,O-dimethyl-S-(isopropylcarbaminylmethyl-)dithiophosphoric acid ester can be obtained from the salts of dimethyldithiophosphoric acid and chloracetic acid-isopropylamide.

The reaction is preferably carried out in an inert organic solvent such as alcohols, acetone, ether; but water or aqueous solutions of alcohols or acetone may also be applied. The reaction may be carried out at temperatures from about 0° C. to about 150° C., preferably temperatures in the range of 10° C. to 50° C. are used, especially suitable is room temperature. Salts of the dimethyl-dithiophosphoric acid which may be used are alkali salts or the salts of ammonia or of amines. Especially the ammonium salt of O,O-dimethyl-dithiophosphoric is preferred to carry out this reaction.

The following example is given by illustration. It is, of course, understood that the invention is not limited thereto.

EXAMPLE 58 grams (0.35 mol) of the ammonium salt of dimethyl-dithiophosphoric acid (M.P. 153° C., decomp.) are treated with 40.5 gm. (0.3 mol) of chloracetic acid-isopropyl-amide (M.P. 62° C.) in 200 ml. of acetone with stirring. The reaction proceeds slowly with a slight increase of temperature. After stirring overnight the reaction product is filtered off with suction from the ammonium chloride, the solvent is distilled off in vacuo, the residual oil taken up in benzene and the benzene layer washed several times with water. After drying over sodium sulphate and distilling off the solvent, 50 grams of the ester are obtained as a rapidly solidifying oil. Yield 64.8% of the theoretical. Recrystallisation from ether gives colourless needles of M.P. 77–78° C.

We claim:
A compound having the formula

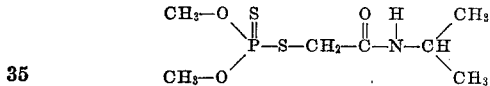

References Cited in the file of this patent
UNITED STATES PATENTS
2,494,283    Cassaday et al. _____ Jan. 10, 1950

OTHER REFERENCES
De Pietri-Tonelli: "Ital. Agr.," 93, No. 1, pages 49–56 (Jan. 1956).
Chem. Abst., 50, No. 21, col. 16, 021 (1956).